(12) United States Patent
Schweitzer, III et al.

(10) Patent No.: US 7,123,457 B2
(45) Date of Patent: Oct. 17, 2006

(54) SYSTEM FOR TRANSITIONING TO THE TRIP THRESHOLD FOR THE START CONDITION THERMAL MODEL FOR A MOTOR PROTECTION RELAY

(75) Inventors: Edmund O. Schweitzer, III, Pullman, WA (US); Stanley E. Zocholl, Holland, PA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 445 days.

(21) Appl. No.: 10/607,908

(22) Filed: Jun. 27, 2003

(65) Prior Publication Data
US 2004/0264074 A1 Dec. 30, 2004

(51) Int. Cl.
*H02H 7/08* (2006.01)
(52) U.S. Cl. .................................... 361/25
(58) Field of Classification Search ............... 361/23, 361/24, 25
See application file for complete search history.

(56) References Cited
U.S. PATENT DOCUMENTS

| | | | | |
|---|---|---|---|---|
| 4,547,826 A | * | 10/1985 | Premerlani | 361/25 |
| 4,914,386 A | * | 4/1990 | Zocholl | 324/772 |
| 5,436,784 A | * | 7/1995 | Schweitzer et al. | 361/25 |
| 5,644,510 A | * | 7/1997 | Weir | 702/132 |
| 5,684,342 A | * | 11/1997 | Innes et al. | 307/117 |
| 5,706,153 A | * | 1/1998 | Innes et al. | 361/31 |
| 5,761,018 A | * | 6/1998 | Blakely | 361/23 |
| 5,872,722 A | * | 2/1999 | Oravetz et al. | 700/292 |
| 2004/0264073 A1 | * | 12/2004 | Zocholl | 361/23 |

\* cited by examiner

*Primary Examiner*—Stephen W. Jackson
*Assistant Examiner*—Boris Benenson
(74) *Attorney, Agent, or Firm*—Cook Alex McFarron Manzo Cummings & Mehler, Ltd.

(57) ABSTRACT

A system used in a protective relay for motors for transitioning the value of the trip threshold to a motor start (stall) condition. The calculated transition trip threshold value follows $I^2t$, specifically, the current to the motor. The transition trip threshold value includes a small fixed initial (offset) value, so that the increase in the trip threshold during transition to the actual start condition threshold value is always slightly ahead of the increase in the $I^2t$ value, preventing a trip until the input current exceeds the final trip threshold for the start condition.

6 Claims, 3 Drawing Sheets

STARTING STATE I > 2.5pu

STARTING STATE I < 2.5pu

SYSTEM FOR TRANSITIONING TO THE TRIP THRESHOLD FOR THE START CONDITION THERMAL MODEL FOR A MOTOR PROTECTION RELAY

TECHNICAL FIELD

This invention relates generally to microprocessor-based motor protection relays, and more specifically concerns a transition model/system for the trip threshold of a start condition thermal model, where the motor protection relay includes both start condition and run condition thermal models.

BACKGROUND OF THE INVENTION

The present invention generally concerns a motor protection relay using thermal models, specifically including a thermal model for the start condition of a motor protection relay and a thermal model for the run condition of the relay. Such a relay is described in U.S. Pat. No. 5,436,784, which is owned by the assignee of the present invention, the contents of which are hereby incorporated by reference.

Briefly, an induction motor operates in either a high current "start" condition or a relatively low current "run" condition. As defined, in the motor's start condition, the current in the rotor is greater than 2.5 times the full load current, while in the motor's run condition, the current in the rotor is less than 2.5 times the full load current.

The thermal model for the motor's start condition, during which time current is flowing through the rotor portion of the motor without the rotor actually moving, is different than the thermal model from the run condition, when the motor is running at its operating speed. The thermal models can be represented by electrical analog circuits, shown for the start condition in FIG. 1A and the run condition in FIG. 1B. In circuit 10 of FIG. 1A, the heating effect in the motor is represented by three elements, a generator 12, the thermal capacity of the rotor 14 and a cooling effect member 16, i.e. the ability of the motor to give off heat. In the start condition, however, the ability of the motor to give off heat is zero.

FIG. 1A shows generator 12 to be represented by a voltage, the thermal capacity of the rotor 14 by a capacitance and the cooling effect 16 (if there is one) by a resistance. The total heating/cooling effect from elements 12, 14, and 16 (although there is in fact no cooling effect 16 for the start condition) is then applied to a comparator 17, which compares the signal information represented by the outputs of the heat generator and the capacitor, with a threshold value. The output of the comparator is a trip signal if the threshold is exceeded.

An existing thermal model for the run condition is shown in FIG. 1B, which shows a heat generator 18, a capacitor 20 which represents the thermal capacity of the system and a cooling effect element 22. In both cases, $R_1$ is the locked rotor electrical resistance, $R_0$ is the running rotor electrical resistance, $I_L$ is equal to the locked rotor current, $T_a$ is the locked rotor time with the motor initially at an ambient temperature, and $T_0$ is the locked rotor time with the motor initially at an operating temperature. Typically, $R_1/R_0$ is equal to 3, while $T_a/T_o$ typically will be 1.2 (the service factor).

Typically, the transition from the higher trip threshold of the start condition to the lower trip threshold of the run condition, representing a "cooling" of the trip threshold because of the overall cooler temperatures in the run condition, is based on an exponential decline using the following formula during transition:

$$U_{th} = T_R(run) + (T_R start - T_R run) \cdot e^{-\frac{t}{RC}}$$

However, when there is a transition between the run condition to the start condition, the threshold change is made substantially instantaneously so that the trip threshold remains ahead of the steeply rising current present in the start (stall) condition of the motor when the rotor is not turning.

As explained in more detail below, an immediate change to the trip threshold for the start condition is sometimes disadvantageous, since the cause of such a transition might be a temporary current spike or a very short-term current rise, instead of the motor actually going into a true start (or stall) condition. Since the trip threshold for the start condition is considerably higher than the run condition, the use of the start condition threshold when the motor is actually in the run condition is not particularly desirable from a protection standpoint. Once the start condition trip threshold is initiated, a relatively long period of time is required while the threshold decreases over time, by virtue of the exponential transition time set forth in the '784 patent.

Accordingly, the trip threshold will be too high for the run condition for a period of time, thus providing possibly insufficient protection for the motor during that time, because the motor could be allowed to heat higher without tripping during the run condition than the true, established trip threshold for the run condition would ordinarily allow. Hence, it would be desirable to provide another, more reliable basis for transitioning to the start condition trip threshold.

SUMMARY OF THE INVENTION

Accordingly, the invention is a protective relay for an induction motor, using thermal models and having known operating parameters, comprising: a circuit for determining $I^2t$ values in the motor; means for establishing a first thermal threshold value for a start condition of the motor; means for determining a representation of the thermal condition of the motor during the start condition thereof, comparing said thermal representation with the first thermal threshold value, and producing an output signal when said first thermal threshold value is exceeded by said start condition thermal representation; means for establishing a second thermal threshold value for a run condition of the motor, wherein the second thermal threshold value is lower than the first thermal threshold value and wherein the run condition of the motor is substantially cooler than the start condition of the motor; means for determining a representation of the thermal condition of the motor during the run condition thereof and comparing that representation with the second thermal value and for producing an output signal when said second thermal threshold value is exceeded by said run condition representation; and a system for calculating a transition to the first thermal threshold value, when the transitioning thermal threshold value is proportional to the motor $I^2t$ value.

BEST MODE FOR CARRYING OUT THE INVENTION

As discussed above, the start condition trip threshold, used in thermal model protection of induction motors, is relatively high compared to the run condition trip threshold, typically permitting heating in the rotor portion of the motor to reach 300° C. without tripping. The transition to the start condition trip threshold is based on the measured current to the motor. When the motor current exceeds 2.5 times the rated motor current, the trip threshold is changed immediately to the higher trip threshold for the start condition, since current greater than 2.5 times the rated current indicates a motor start or stall condition requiring the higher trip threshold.

Figure 1A:
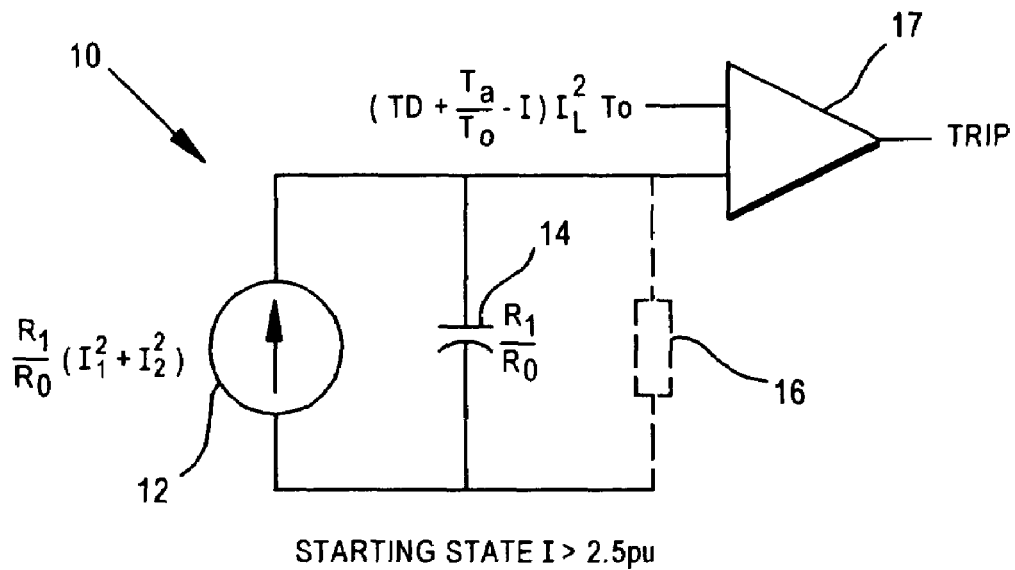
FIGS. 1A and 1B show electrical representations of the start condition and run condition thermal models for an induction motor protection relay.
Figure 1B:
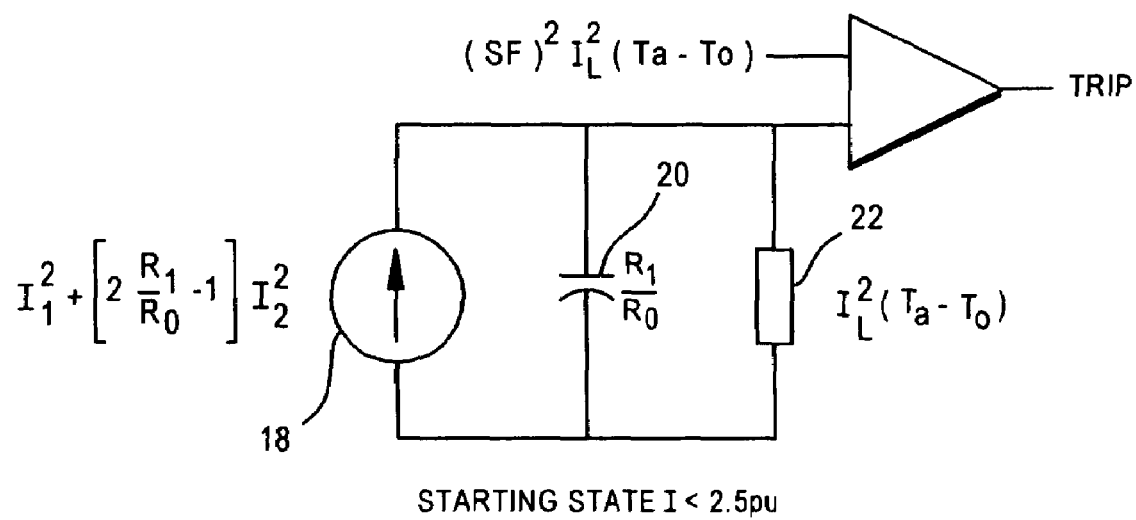
Figure 2:
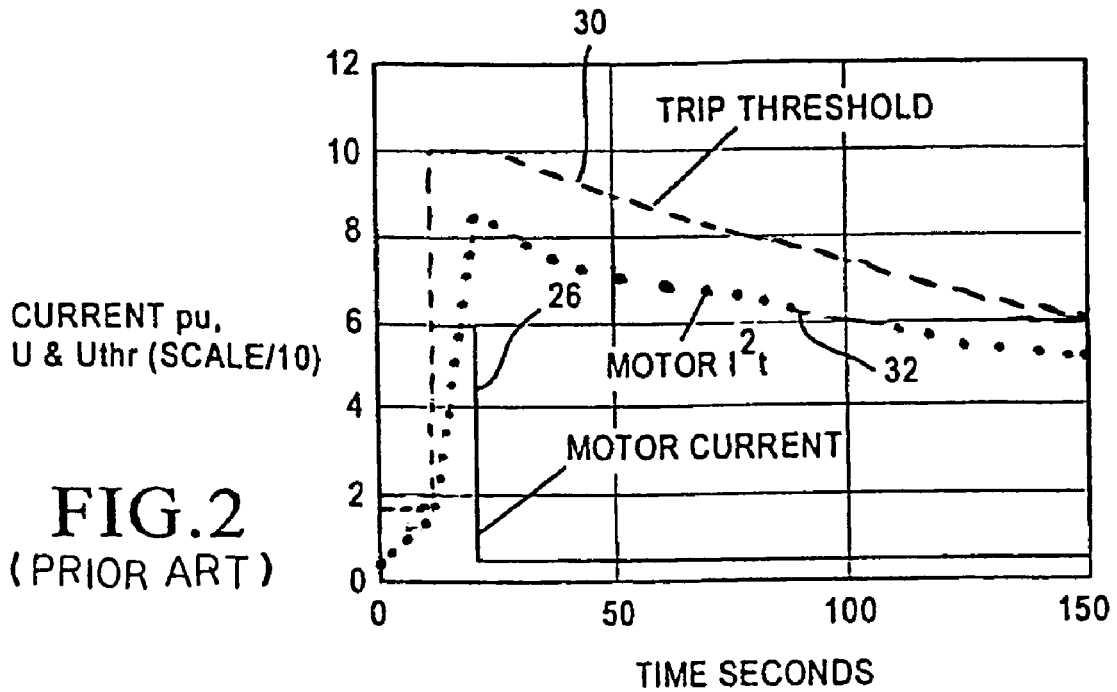
FIG. 2 is a chart of current versus time for a prior art transition system to a start condition trip threshold.

This is represented in FIG. 2, where motor current is represented at 26. An increase in motor current results in the trip threshold value 30 rising to the high level immediately and then gradually declining exponentially to the run condition trip threshold when the motor current 26 declines below the 2.5 times the rated current level. The fast increase in trip threshold is necessary to stay above the initially rapidly increasing value of I²t (32), which is moving toward the hot spot temperature of a locked rotor, information typically provided by the manufacturer.

As stated above, however, the time of an increase in motor current may in some cases not be long enough (such as for a short stall or a current spike) to require that the motor trip threshold be increased to the start condition level. If the trip threshold transition is in fact made, however, and the motor continues in its run mode, the motor will be under-protected for a period of time during which the trip threshold decreases to the true run condition value.

Figure 3:
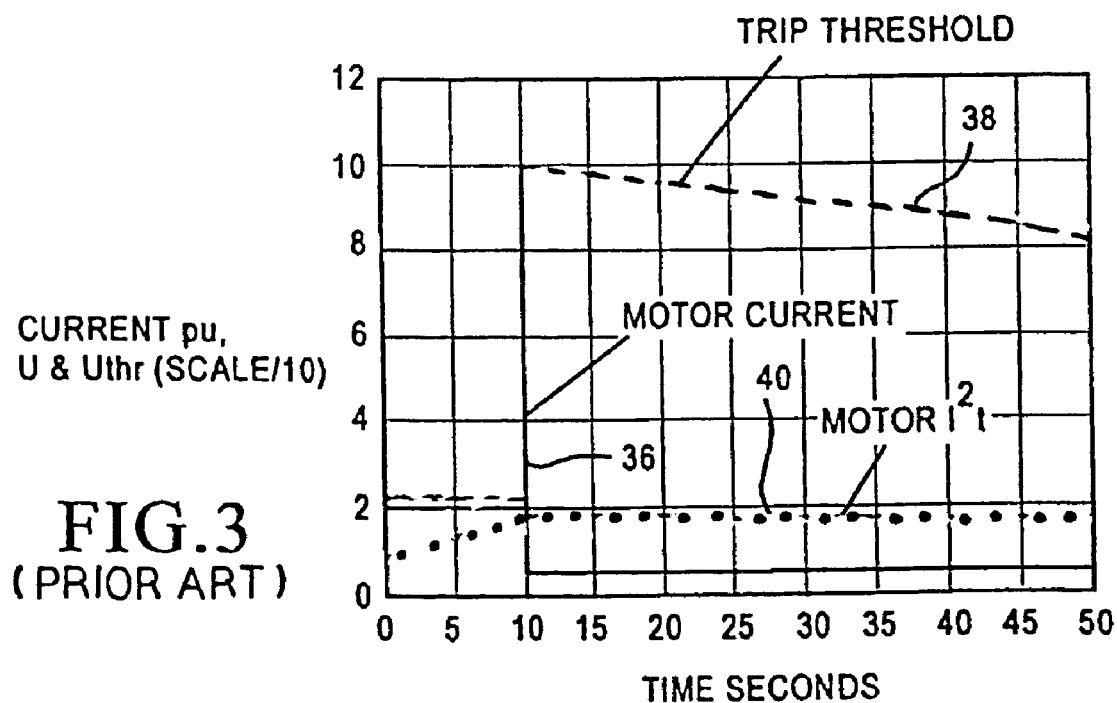
FIG. 3 is a similar current versus time chart for a prior art transition system to a start condition trip threshold in response to a transient current pulse to the motor.

This is illustrated in FIG. 3, in which there is a transient current pulse 36 to the motor, which immediately disappears. However, the transient pulse 36 is of great enough magnitude to cause the trip threshold 38 to increase to its start condition value, which is inappropriate because the motor is still actually in its run condition. The I²t value 40 stays low. Following the disappearance of the transient pulse, the trip threshold will then gradually decline at an exponential rate (as discussed in the '784 patent), with the motor still operating in a run condition, until the conventional run condition trip threshold is reached.

In the present invention, a new transition system to the start trip threshold is incorporated in the thermal model protection system. Instead of the trip threshold immediately changing to the start condition trip threshold when the current to the motor increases above 2.5 times the rated current, the trip threshold value is increased in concert with the motor I²t value. Further, the I²t value defining the trip threshold (in combination with the offset value) will follow the motor current (as the square thereof), but will stop increasing when the motor current itself stops increasing. The I²t trip threshold value is always slightly ahead of the actual value of motor I²t, so that the motor I²t value will not catch up to the trip threshold value during the time that the I²t trip threshold value is increasing to its final start condition value. Thus, the calculated threshold, based on I²t, will reach the starting condition trip threshold before the motor I₂t reaches the trip threshold. Thus, an unwarranted trip action is prevented.

Figure 4:
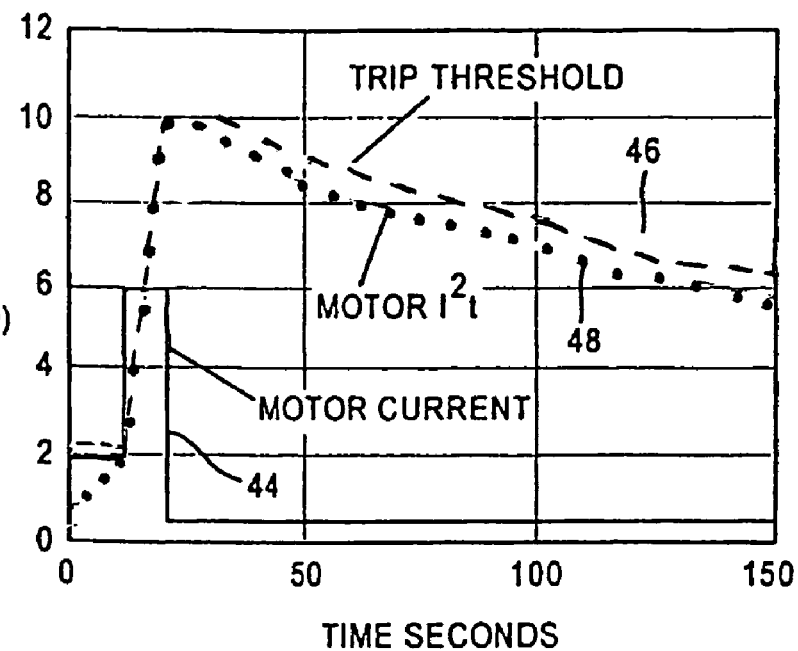
FIGS. 4 and 5 are current versus time charts similar to FIGS. 2 and 3 using the trip threshold transition system of the present invention.

FIG. 4 shows the time current representation, using the I²t system of the present invention, for a short stall current condition of 5–10 seconds 44, during which time the motor current is well above the 2.5 multiplier factor. The transition of the trip threshold 46 tracks the I²t value 48 of the input motor current, i.e. as the square of the input current. The trip threshold increase tracks the motor I²t increase, except it is always slightly ahead in magnitude.

The trip threshold increase during this transition is provided by the following formula:

$$U_{th} = I^2 t + U_0$$

in which $U_{th}$ is equal to the trip threshold during the transition, and $U_0$ is the small initial offset value which has the effect of maintaining the calculated trip threshold value based on motor I²t, slightly ahead of the actual motor I²t value. Once the trip threshold is reached using the calculated I²t value, and the motor current decreases to run condition levels, indicating that the trip threshold should change to the run condition value, the trip threshold begins to decrease, in a conventional manner.

Figure 5:
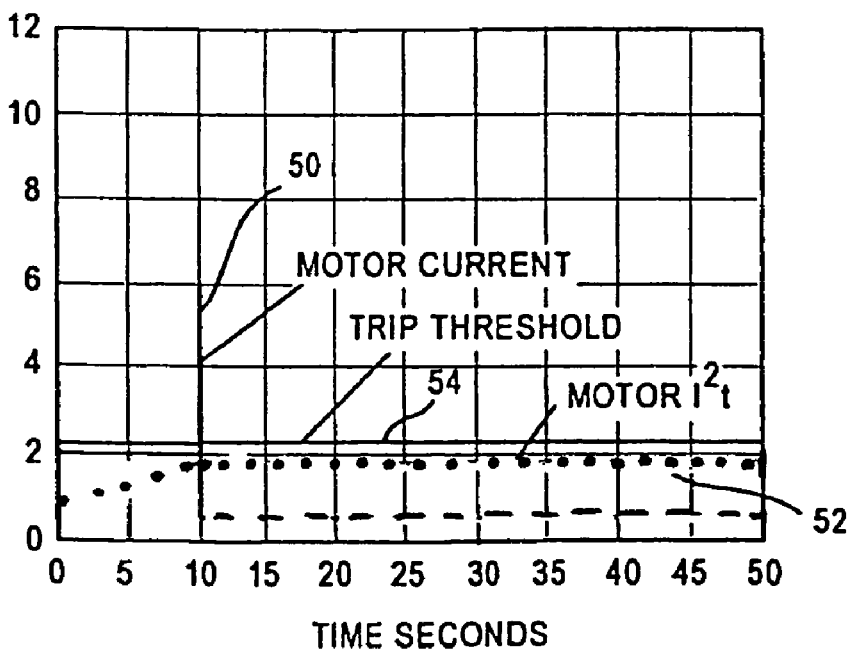

When the motor current decreases back to run condition levels, the I²t trip threshold value of the present will decline, with the motor current. A significant advantage of the present system concerns the event of an input current pulse to the motor which quickly disappears. Such a pulse is shown at 50 in FIG. 5. With respect to such a transient current pulse, the motor I²t value 52 will basically not increase; hence, the trip threshold value 54 for the motor will not change in response to the pulse (because the I²t value does not change), leaving the motor with a run condition trip threshold during the time that the motor is actually still in its run condition.

The present system thus has the advantageous result of providing full protection for the motor during its run condition, with the protection being uncompromised by short transient current pulses. The present system can have an additional advantage in those cases where the temperature of the motor is recorded as a percentage of motor current. In this case, the temperature can be recorded as a percentage of the measured I²t value throughout the operation of the motor.

Although a preferred embodiment of the invention has been described for purposes of illustration, it should be understood that various changes, modification and substitutions may be incorporated in the embodiment without departing from the spirit of the invention which is defined in the claims which follow.

What is claimed is:

1. Within a protective relay for an induction motor, a method of determining a trip point comprising the steps of:
   determining I²t values in the motor;
   establishing a first thermal threshold value for a start condition of the motor;
   determining a first thermal representation of a thermal condition of the motor during a start condition thereof;
   comparing said first thermal representation with the first thermal threshold value, and producing an output signal when said first thermal threshold value is exceeded by said first thermal representation;
   establishing a second thermal threshold value for a run condition of the motor, wherein the second thermal threshold value is lower than the first thermal threshold value and wherein the run condition of the motor is substantially cooler than the start condition of the motor;

determining a second thermal representation of the thermal condition of the motor during the run condition thereof;

comparing the second thermal representation with the second thermal value and for producing an output signal when said second thermal threshold value is exceeded by said second thermal representation; and calculating a transition to the first thermal threshold value, resulting in a calculated transitioning thermal threshold value, wherein the calculated transitioning thermal threshold value is proportional to the motor $I^2t$ value.

2. The method of claim 1, wherein the step of calculating a transition to the first thermal threshold value includes the step of utilizing a fixed offset value of current, such that the calculated transitional thermal threshold value increases white transitioning from said fixed value, the calculated transitional thermal threshold value thus being always ahead of the motor $I^2$ value during normal operation of the motor.

3. The method of claim 2, wherein the first thermal threshold value, the second thermal threshold value, the first thermal representation, and the second thermal representation all are for a rotor portion of the motor.

4. The relay of claim 2, wherein the step of determining the first thermal representation includes a representation of a heating effect within the rotor, a thermal capacity of the rotor, and a cooling effect of the rotor, and wherein the step of determining the second thermal representation includes a representation of the heating effect within the rotor, the thermal capacity of the rotor, and the cooling effect of the rotor.

5. The method of claim 1, including the step of disregarding a transient current pulse to the motor such that said transient current pulse does not result in a transition to the start condition thermal threshold.

6. In a protective relay for an induction motor which includes a start condition thermal model, a run condition thermal model and a processing circuit for producing an output trip signal when trip thresholds associated with the thermal models are exceeded, wherein the relay includes a start condition trip threshold and a run condition trip threshold, the start condition trip threshold being higher than the run condition trip threshold, a method for transitioning the trip threshold from the run condition trip threshold to the start condition trip threshold, comprising:

determining 12t values in the motor; and calculating a transition to the start condition trip threshold, resulting in a calculated trip threshold, wherein the calculated trip threshold follows the $I^2t$ value until it reaches the established start condition trip threshold.

* * * * *